June 18, 1957 G. N. WILLIS ET AL 2,796,195
METERING PUMP
Filed Aug. 14, 1953 4 Sheets-Sheet 1

INVENTORS
GRANT N. WILLIS
FRANK A. CLARY, JR.
BY
their ATTORNEY

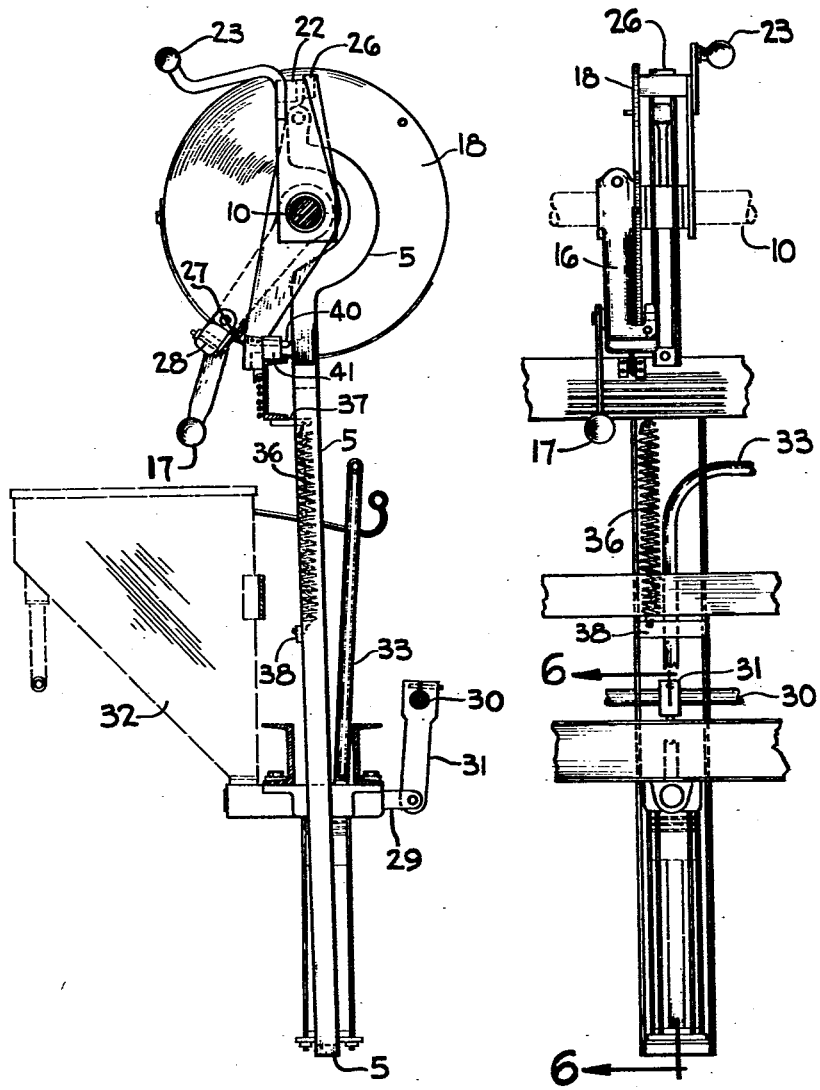

June 18, 1957 G. N. WILLIS ET AL 2,796,195
METERING PUMP
Filed Aug. 14, 1953 4 Sheets-Sheet 3
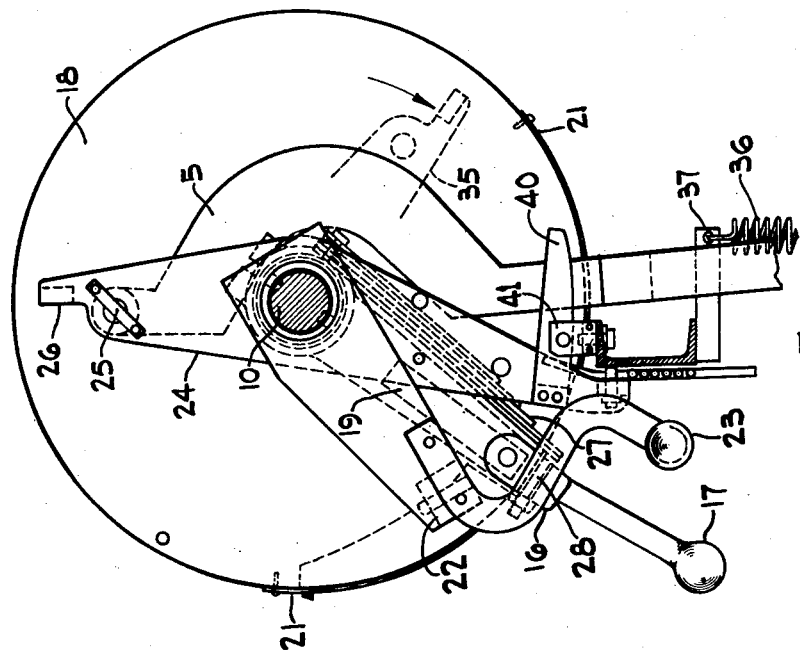
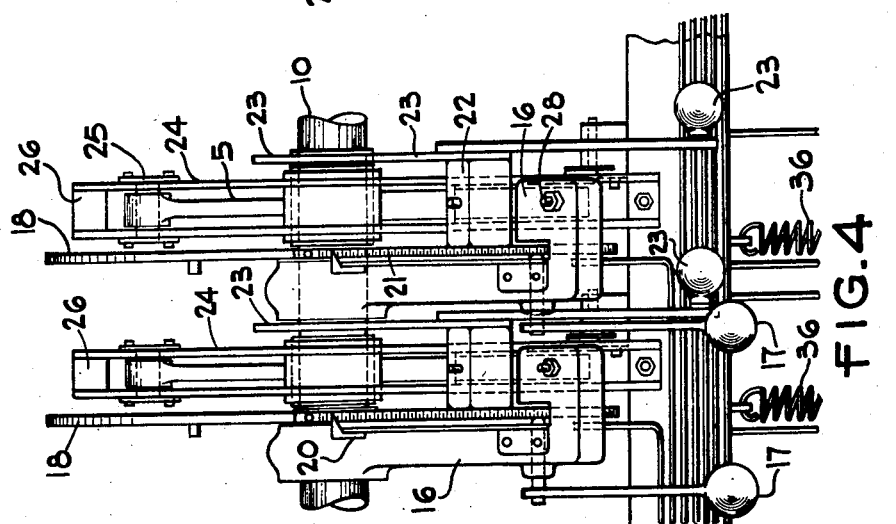
INVENTORS
GRANT N. WILLIS
FRANK A. CLARY, JR.
BY
ATTORNEY

INVENTORS
GRANT N. WILLIS
FRANK A. CLARY, JR.
BY
ATTORNEY

United States Patent Office 2,796,195
Patented June 18, 1957

2,796,195

METERING PUMP

Grant Noble Willis and Frank Alfred Clary, Jr., Bristol, Conn., assignors to The Martin-Senour Company, Chicago, Ill., a corporation of Ohio Application August 14, 1953, Serial No. 374,394

3 Claims. (Cl. 222—28)

This invention relates to a metering pump for accurate dispensation of liquids in variable quantities.

More particularly, this invention relates to a metering pump of the piston type capable of being set, through calibrated means, to deliver any desired fraction of the full displacement of the pump by novel controlling means limiting the effective length of stroke of the piston in said pump.

Pumps of the character herein described are adaptable to deliver metered quantities of a variety of liquids and are particularly suited to multiple usage where blending of various qualities of liquids in pre-determined proportions is to be accomplished and accuracy of the proportions metered must be held within very close limits.

While the number of purposes for which proportioning pumps are used is very large, the invention herein described is adaptable to use with a wide variety of liquids. It is particularly desirable in metering exact quantities of liquid colorants for use in mechanical color matching and producing of protective and decorative coatings with predetermined standards, as exemplified by automobile lacquers and enamels and interior decorative paints and custom colors for a variety of purposes.

Pumps heretofore adapted to delivery of metered quantities of liquids most often fail to provide means for infinite variation in quantity over the total potential displacement. In other words, metering pumps may be set to deliver pints, quarts or gallons but are not generally adapted to infinite variation within their displacement range. For example, one embodiment of the present invention now in use can be set to deliver one one-thousandth of a quart. It can also be set to any fraction between this limit and a full quart. As the proportion selected becomes greater, the accuracy of the machine consistently increases. The importance of infinite variation within the displacement range, and accuracy within the range are of paramount importance, for example, in metering a variety of color bases to produce custom colors matching a standard.

It is the principal object of this invention to provide a metering pump capable of adjustment to deliver an infinite variety of quantities or proportions of its total displacement with a particularly high degree of accuracy at small increments of its total displacement.

It is a further object of this invention to provide a metering pump adapted to use in plural number, so constructed as to require little space and to provide continuous variation in piston displacement through adjustable calibrated dial means governing the quantity of liquid deliverable therefrom.

It is a specific object of this invention to provide a metering pump having a constant sweep driving means, a variable sweep driven means, piston displacement means operably connected to said driven means and selectively adjustable calibration means adapted to control and to vary the sweep lost between said driving and said driven means.

Other and further objects will appear as the description of the invention proceeds.

A preferred embodiment of the invention is shown in the accompanying drawings, in which:

Figure 2 is a vertical section taken along the line 2—2 of Figure 1, with parts removed for the sake of clarity.

Figure 3 is a front elevation of a single unit corresponding to the section shown in Figure 2 with nonessential parts removed and other parts broken away.

Figure 4 is an enlarged fragmentary front elevation the control means (in duplicate) governing variability of displacement of the pump.

Figure 5 is an enlarged fragmentary side elevation of the control means illustrated in Figure 4.

Figure 6:
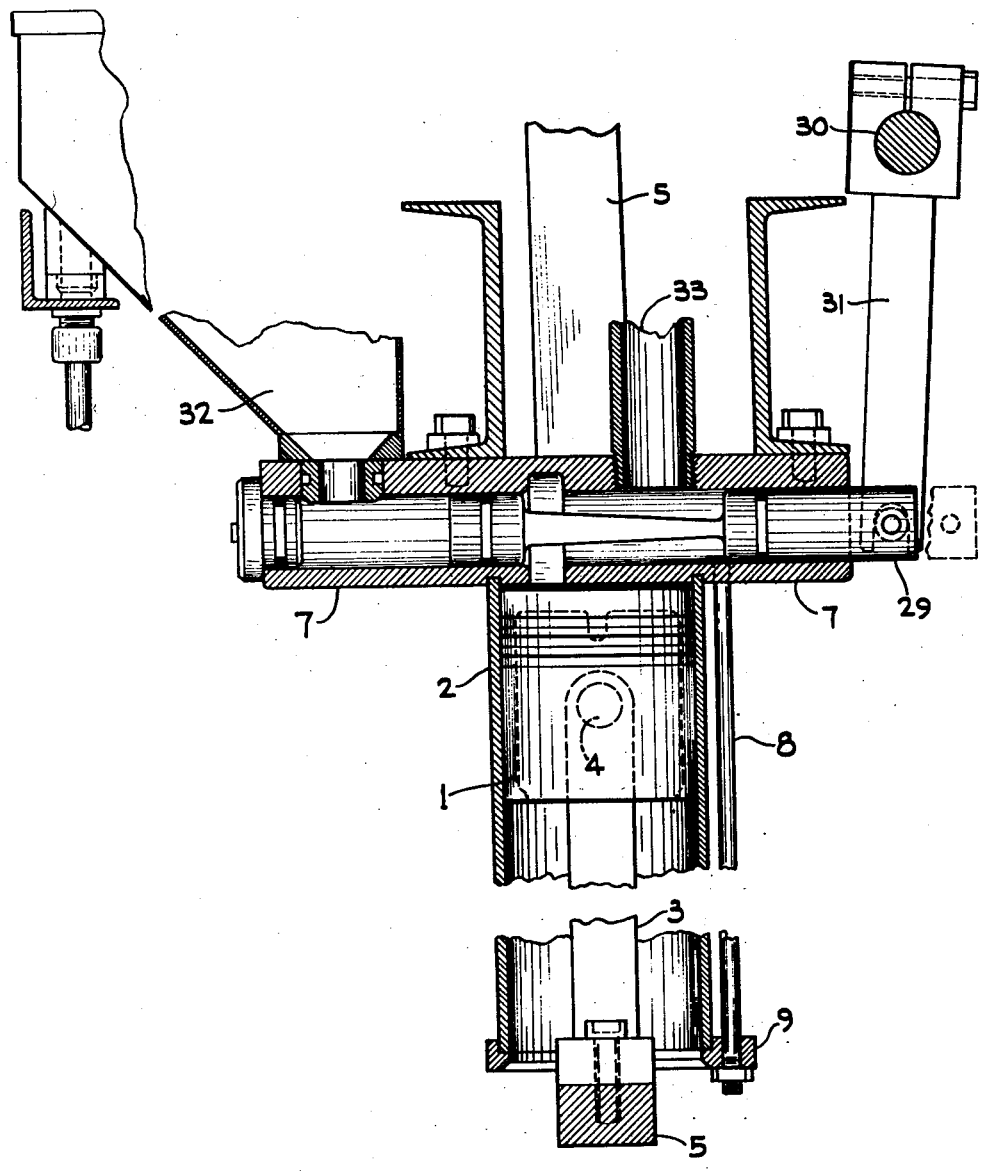
Figure 6 is an enlarged vertical sectional elevation along the line 6—6 of Figure 3.

Initially referring to Figure 6, displacement of piston 1 within the cylinder 2 is brought about by rod 3 connected at one end to piston 1 by pin 4 and at the other end to connecting rod yoke 5 by suitable attachment means. Cylinder 2 is held in place by long bolts 8 acting through ring 9 adapted to support cylinder sleeve 2 under the valved cylinder head 7.

Movement of main power shaft 10 (Figure 1), journalled in supporting pillow blocks 11, 12, 13 and 14 acting through linkages as will be described, results in intake and exhaust stroke of piston 1 imparted thereto through yoke 5. Movement of power shaft 10 is oscillatory in nature and may be powered by a main crank arm 15, driven from associated power transmission means.

Oscillatory motion of power shaft 10 is transferred to crank arm 16 (Figure 3) keyed to shaft 10. Clamping lever 17 of crank arm 16 is adapted to release calibrated dial 18 (Figures 4 and 5) freely movable about power shaft 10 when clamping lever 17 is released. Lever 17 releases dial 18 by upward movement and clamping plate 19 interior of arm 16 engages the face of dial 18 by downward positioning of lever 17. Also associated with the clamping arm 16 is an indicator finger 20 which is co-relatable with calibrated scale 21 attached to the rim of dial 18. Dial 18 is operatively connected through bridge stop 22 to dial handle 23 also pivoted to move freely about shaft 10. Dial handle 23 facilitates setting of dial 18 when lever 17 is released. Dial 18 and dial handle 23 span rocking beam 24 the top end of which encloses and is operably connected to yoke 5 by pin 25. Rocking beam 24 is freely rotatable about shaft 10. Stop 26 at the upper end and leaf spring 27 held within the lower end of rocking beam 24 are adapted to engage bridge stop 22 and adjusting stop bolt 28 in the base of clamping arm 16, respectively.

Figure 1:
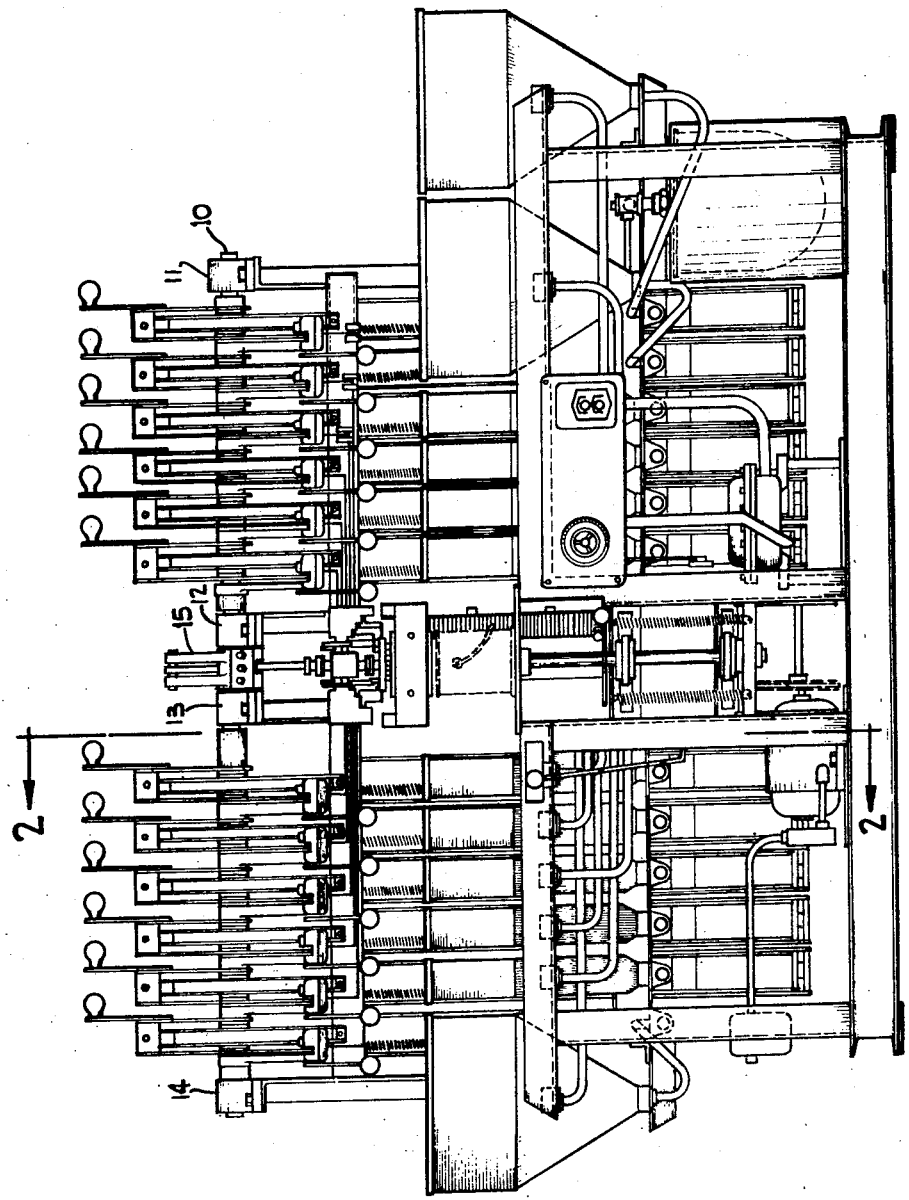
Figure 1 is a complete assembly of a dispensing machine including a plurality of metering pumps for liquid colorant showing a preferred adaptation of the present invention.

Thus, if dial 18 is set as in Figures 1, 2 and 3, immediately upon motion rearward and downward of crank 15 (Figure 1) and shaft 10, bridge stop 22 of dial 18 clamped to crank arm 16 contacts rocking beam 24 at stop 26 and the intake stroke of piston 1 is started by transfer of motion to yoke 5, connecting rod 3 and piston 1 in cylinder 2.

Before the intake stroke, valve 29 (Figure 6) is moved to the extreme right (dotted position) by timed motion of jackshaft 30 and lever arm 31 which is cam-operated. The valve action opens a channel from liquid supply means 32 to the piston 1 chamber. At completion of the intake stroke and reversal of the oscillatory motion of shaft 10, stop 28 of crank arm 16 engages the outer end of spring 27 forcing return of rocking beam 24 in a reverse direction, raising yoke 5 and its appended elements, causing piston 1 to displace liquids through discharge port 33, opened by shifting of valve 29 to the extreme left (as shown in Figure 6) at the completion of the intake stroke.

Infinite adjustment of the displacement of the pump arises through control of the number of degrees of arcuate motion lost between the driving crank arm 16 keyed to shaft 10 and the driven rocking beam 24 whose rotational motion is transferred to linear motion by yoke 5 and ultimately into piston 1 displacement. Adjustment and control is accomplished by means of calibrated dial 18 which may be set to deliver any proportion of the total displacement of piston 1 by the following means.

Lever handle 17 is raised to release dial 18 from clamped attachment to crank arm 16. Dial handle 23 is then readily moved until indicator finger 20 coincides with the number of parts of delivered liquid desired, according to the calibrated scale 21. Such positioning is illustrated in Figures 4 and 5. Clamping lever 17 is returned downward seizing dial 18 as though the dial were integral with crank arm 16.

Now, upon start of rotation of crank 15 and shaft 10 in a clockwise direction, or corresponding intake stroke, rocking beam 24 is not moved until bridge stop 22 has been rotated through a sufficient number of degrees of arc (or lost motion) to contact stop 26 of rocking beam 24. Thus the arcuate distance traversed by rocking beam 24 may be reduced to some position intermediately between the position shown and that indicated by dotted position 35 (Figure 5) from which it can be seen that the intake stroke of piston 1 is correspondingly reduced and the total displacement of the pump controlled to any fraction of its total by a setting of the dial 18. Overall capacity of the pumping unit is readily adaptable to the problem at hand by changes in piston diameter as well as the overall length of stroke thereof.

Ancillary to the mechanical features described above, spring 36 attached to one end of frame member 37 and at the other to cross arm 38 of yoke 5 assists in returning the pump at the end of its displacement stroke. Knife blade 40 attached to the lower end of rocking beam 24 engages a spring loaded ball bearing in a slit in block 41 attached to the frame to prevent rocking beam 24 from drifting due to friction on shaft 10 during the lost motion period particularly when set to deliver small quantities of colorant.

This application is copending with U. S. Serial Number 374,302 directed to a dispensing machine utilizing the metering pump herein described and U. S. Serial Number 374,392 directed to a dispensing valve associated with the metering pumps in said dispensing machine, filed of even date herewith, which are incorporated herein by reference.

A preferred embodiment of our invention in metering pumps has been described and illustrated in the foregoing. However, variation in mechanical detail and adaptation to specific conditions are well understood and such changes and modifications are contemplated to fall within the spirit and scope of the appended claims.

We claim:

1. A metering pump which comprises a main shaft, oscillatory driving and driven means centered on said shaft, calibrated dial means rotatable about said shaft, means associated with said driving means adapted temporarily to attach said dial means to the driving means at any selected dial calibration, means associated with said dial means to engage and drive said driven means, said dial means determinative of the motion lost between said driving means and said driven means and a piston pumping means associated with said driven means.

2. A metering pump of the class described which comprises an oscillatory main crankshaft, a plurality of graduated dials supported by and freely rotatable about the center of revolution of said main crankshaft, a plurality of throws on said main crankshaft, coupling means on said throws to lock said dials to said throws at any point of graduation of said dials, stop means on said dials adapted to contact and to operate rocking beams freely rotatable about the center of rotation of said dials, said rocking beams adapted to translate rotary motion of said main crankshaft through associated throws and settable dials into linear motion of associated fixed length connecting rods operably attached to corresponding metering pistons, displacement of each of said pistons individually correlated to vary with the settings of said dials.

3. A metering pump comprising a constant angle of oscillation driving means and a variable angle of oscillation driven means centered on the same shaft, a calibrated dial means intermediate said driving and driven means and means associated with said dial to control and to vary selectively the angle of rotation lost between said driving and said driven means and a piston displacement means operated by said driven means.

References Cited in the file of this patent

UNITED STATES PATENTS

| | | |
|---|---|---|
| 226,940 | Stuz | Apr. 27, 1880 |
| 259,022 | Jarecki | June 6, 1882 |
| 1,980,090 | Rockwell | Nov. 6, 1934 |
| 2,036,452 | Bolutch et al. | Apr. 7, 1936 |
| 2,415,419 | Cozzoli | Feb. 11, 1947 |
| 2,670,683 | Lundh | Mar. 2, 1954 |